United States Patent [19]

Kubo et al.

[11] 4,440,276

[45] Apr. 3, 1984

[54] TORQUE CONVERTER LOCK UP CLUTCH SHOCK ABSORBER WITH PRESSURE TRANSMITTING HOLE THROUGH DISK ELEMENT

[75] Inventors: Seitoku Kubo, Toyota; Koujiro Kuramochi, Okazaki; Tatsuo Kyushima, Toyota, all of Japan

[73] Assignee: Toyota Jidosha Kabushiki Kaisha, Toyota, Japan

[21] Appl. No.: 282,187

[22] Filed: Jul. 10, 1981

[30] Foreign Application Priority Data

Jul. 28, 1980 [JP] Japan .................................. 55-106647

[51] Int. Cl.³ .............................................. F16D 39/00
[52] U.S. Cl. ................................................. 192/3.29
[58] Field of Search ...................... 192/3.29, 3.28, 3.3, 192/106.2, 106.1

[56] References Cited

U.S. PATENT DOCUMENTS 4,088,212  5/1978  Brown ................................ 192/106.2
4,305,487  12/1981  Sundhara ........................ 192/106.2

Primary Examiner—George H. Krizmanich
Attorney, Agent, or Firm—Stevens, Davis, Miller & Mosher

[57] ABSTRACT

A rotary power transmission device including a hydraulic torque converter which transmits rotary power between coaxial power input and power output shafts, and a lock up clutch system which also transmits rotary power between the power input and power output shafts, wherein the lock up clutch system includes a rotary shock absorber including a disk shaped plate element and two ring shaped plate elements cooperating with an outer peripheral portion of the disk shaped plate element in an axially superposed manner so as to provide a rotationally cushioning assembly positioned in an annular space formed adjacent an outer peripheral portion of the turbine of the hydraulic torque converter, while the radially inner portion of the disk shaped plate element is rotationally connected to the power output shaft in parallel with and separately from the turbine, wherein the disk shaped plate is formed with through openings along a radially intermediate annular region thereof for transmitting fluid pressures therethrough.

3 Claims, 5 Drawing Figures

TORQUE CONVERTER LOCK UP CLUTCH SHOCK ABSORBER WITH PRESSURE TRANSMITTING HOLE THROUGH DISK ELEMENT

BACKGROUND OF THE INVENTION

The rotary power transmission device having an input shaft, an output shaft, and a fluid torque converting structure which includes a pump impeller, a turbine member, and a stator member incorporated between the input shaft and the output shaft and which further incorporates a lock up clutch for selectively mechanically coupling the input shaft and the output shaft, is already well known as a device to be incorporated in the power transmission system of an automobile. Many of these rotary power transmission devices further incorporate rotary shock absorbers in their rotary power transmission routes which provide flexibility in the rotational direction between the rotary power transmission members of their lock up clutches, so as to avoid transmission of shocks between their power input shafts and their power output shafts, i.e. between the engines and the driven wheels of the automobiles to which these transmission devices are fitted. A rotary shock absorber of this kind comprises first and second disk elements arranged as spaced along their common axis and connected with each other with respect to their rotational movement, a third disk element provided between the first and the second disk elements so as to be rotatable relative to the first and second disk elements, and a plurality of compression coil springs adapted to act between the combination of the first and second disk elements and the third disk element.

Conventionally, a rotary shock absorber of this type has generally been constructed with such a structure that the compression coil springs are arranged along a circle having a relatively small diameter, so that the rotary shock absorber is arranged along the root portion of the pump impeller. However, in order to meet with the requirement that the fluid torque converter and the lock up clutch should be mounted within a very limited axial space such as is available in the case of a front engine front wheel drive automobile or a so called FF automobile, it has been proposed to provide such a rotary shock absorber in an annular space left between the outer peripheral portions of the fluid torque converter generally having a toroidal shape and the lock up clutch generally having a disk shape, so that the compression coil springs which have a relatively large cross sectional area can be fitted into the annular space having an approximately triangular cross section. In this case, the rotary shock absorber is constructed to be of a relatively large diameter.

When a rotary shock absorber of the abovementioned type is constructed to have a relatively large diameter, two of the above mentioned first, second, and third disk elements inevitably become ring shaped elements having relatively small radial widths as compared with their radiuses or diameters, while the third one inevitably becomes a substantially disk shaped element having a relatively large diameter. When the disk element having such a relatively large diameter is positioned so as substantially to traverse the space left between the fluid torque converter and the lock up clutch, said lock up clutch typically being engaged and disengaged according to the direction of flow of the hydraulic fluid being supplied to the torque converter, a substantial pressure difference is liable to be generated between the opposite sides of the disk element which is to be made of a relatively thin plate member in order to reduce the weight of the rotary shock absorber, and thereby the disk element is liable to be irregularly deformed.

SUMMARY OF THE INVENTION

Therefore, it is a primary object of the present invention to provide a rotary power transmission device incorporating a fluid torque converter and a lock up clutch with a rotary shock absorber of the above mentioned type which utilizes the annular space available between the outer peripheral portions of the fluid torque converter and the lock up clutch for its location, wherein the thin disk element having a large diameter of the rotary shock absorber is effectively protected from being irregularly deformed by the forces generated by such pressure difference across said disk element.

It is a further object of the present invention to provide such a rotary power transmission device incorporating such a rotary shock absorber, in which the switching over of the lock up clutch from the engaged state to the disengaged state, and from the disengaged state to the engaged state, according to said selective supply of fluid pressure thereto through two channels, is quick and effective.

It is a further object of the present invention to provide such a rotary power transmission device incorporating such a rotary shock absorber, in which actuating fluid pressure for said lock up clutch is quickly and reliably transmitted thereto to actuate it, past said flat disk shaped shock absorber plate element.

It is a yet further object of the present invention to provide such a rotary power transmission device incorporating such a rotary shock absorber, in which a means for substantially freely transmitting fluid pressure between the two sides of said flat disk shaped shock absorber plate element is implemented simply by making a hole in said flat disk shaped shock absorber plate element.

It is a yet further object of the present invention to provide such a rotary power transmission device incorporating such a rotary shock absorber, in which a certain additional amount of rotational cushioning between the power input shaft and the power output shaft, when said lock up clutch is engaged, is available by the flexibility of said flat disk shaped shock absorber plate element.

According to the present invention, these and other objects are accomplished by a rotary power transmission device for transmitting rotary power rotating around a central rotational axis, comprising: (a) coaxial power input and power output shafts; (b) a torque converter adapted to be filled with hydraulic fluid, comprising a pump impeller rotationally connected to said power input shaft, a turbine member rotationally connected to said power output shaft, and a stator member; circulation of hydraulic fluid, when said torque converter is filled therewith, around a hydraulic fluid path defined by said pump impeller, said turbine member, and said stator member transmitting rotary power from said power input shaft to said power output shaft; (c) a substantially disk shaped clutch assembly coaxial with said torque converter, said clutch assembly comprising a first clutch plate element rotationally coupled to said power input shaft, and a second clutch plate element axially opposing said first clutch plate element; (d) a rotary shock absorber mounted between said torque converter and said clutch assembly so as rotationally to couple said second clutch plate element and said power output shaft with a certain amount of resilient rotational play therebetween, comprising: (d1) three axially superposed shock absorber plate elements, two of said three shock absorber plate elements being formed as substantially flat rings and the other one being formed as a substantially flat disk, at least one of said ring shaped plate elements being rotationally coupled to said second clutch plate element and said disk shaped plate element being rotationally coupled to said power output shaft, the two outer ones of said shock absorber plate elements being rotationally coupled together, and a hole being formed through said flat disk shaped shock absorber plate element; and (d2) a means for rotationally connecting together the combination of said two outer shock absorber plate elements and said middle shock absorber plate element with a certain amount of resiliently opposed rotational play being available therebetween; and (e) a means for supplying a first fluid pressure to the side of said second clutch plate element remote from said flat disk shaped shock absorber plate element and for supplying a second fluid pressure to the side of said flat disk shaped shock absorber plate element remote from said second clutch plate element.

According to such a construction, by the provision of said hole for substantially freely transmitting fluid pressure between the two sides of said flat disk shaped shock absorber plate element, said second fluid pressure supplied to the side of said flat disk shaped shock absorber plate element remote from said second clutch plate element is transmitted to the side of said flat disk shaped shock absorber plate element towards said second clutch plate element, to be transmitted to the side of said second clutch plate element towards said flat disk shaped shock absorber plate element; whereby said second clutch plate element is moved to and fro according to said selective variation of the relative magnitudes of said first fluid pressure and said second fluid pressure which are present on its opposite sides, so as to be selectively engaged to and disengaged from said first clutch plate element.

BRIEF DESCRIPTION OF THE DRAWINGS

The present invention will become more fully understood from the following description of a preferred embodiment thereof, which is to be taken in conjunction with the accompanying drawings. It should be clearly understood, however, that the description of the embodiment, and the drawings, are all of them provided purely for the purposes of illustration and exemplification only, and are in no way to be taken as limitative of the scope of the present invention. In the drawings.

DESCRIPTION OF THE PREFERRED EMBODIMENT

Figure 1:
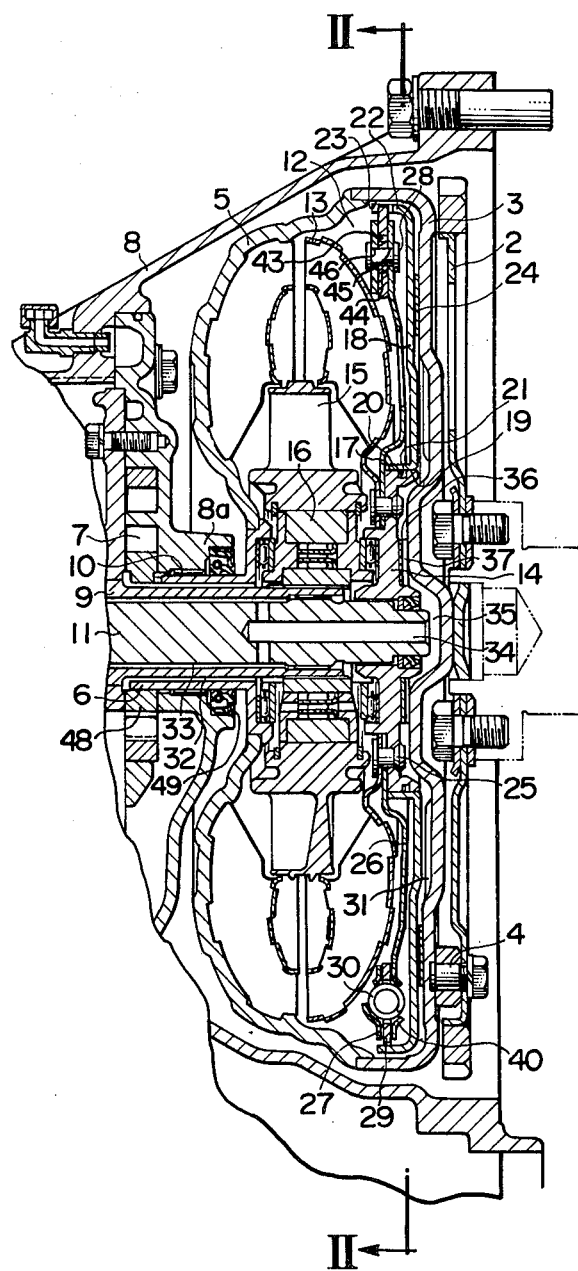
FIG. 1 is a composite sectional view through said preferred embodiment of the rotary power transmission device incorporating a torque converter with a lock up clutch and a rotary shock absorber according to the present invention, showing the basic structure of the rotary power transmission device, and also showing various structures of the rotary shock absorber assembly as sectioned by various planes inclined at various angles to the central rotational axis of the torque converter.

Referring to FIG. 1, the reference numeral 1 denotes a power input shaft of the rotary power transmission device according to the preferred embodiment of the present invention. This power input shaft 1 is only shown in phantom form in the drawings, and is connected to a rotary power output member such as a crankshaft of an internal combustion engine not shown in the drawings. The power input shaft 1 is rotated in the clockwise direction as viewed from the right of FIG. 1 looking towards the left. To the left hand end in the figure of the power input shaft 1 there is connected a flywheel 2 by a plurality of bolts. By a plurality of bolts 4 there is connected to this flywheel 2 a torque converter housing front cover 3, which is formed as a generally dish shaped member with an outer peripheral axially extending flange, which extends to the left in FIG. 1, and which is formed with an inner cylindrical surface 23. Against the left hand circumferential edge in FIG. 1 of this outer peripheral axially extending flange there is abutted the right hand circumferential edge of the casing portion of a pump impeller 5. The pump impeller 5 comprises this casing portion and also comprises a plurality of vanes formed on the inside of this casing portion. The pump impeller 5 is fixed to a hollow shaft 6, which is coaxial with the power input shaft 1, and which is freely rotatably supported, via a supporting structure 10 mounted around its outside surface which may be a needle roller bearing assembly or the like, by the hub portion 8a of a fixed torque converter housing 8. The left hand end of the hollow shaft 6 in FIG. 1 is rotationally engaged to and drives the inner rotor member 48 of a hydraulic fluid pump assembly 7. A seal assembly 49 is fitted between the outer surface of the hollow shaft 6 and said hub portion 8a of the fixed torque converter housing 8, so as to prevent escape of hydraulic fluid from out of the inside of the torque converter. Through the central hollow portion of the hollow shaft 6 there passes a fixed hollow sleeve member 9, the left hand flanged end of which is fixed to the hub portion 8a of the torque converter housing 8 by a plurality of bolts, and which extends rightwards in the figure to an intermediate position within the torque converter where it projects out of the hollow shaft 6, where there is mounted on said fixed sleeve member 9 via a one way brake 16 a torque converter stator member 15 formed with a plurality of vanes.

Through the central hollow portion of the sleeve member 9 there passes a power output shaft 11, the left hand end of which in FIG. 1 extends outwards to the left of the torque converter assembly in order to provide output of rotational power therefrom. The right hand end of this power output shaft 11 in FIG. 1 protrudes out from the right hand end of the sleeve member 9, inside the torque converter. On this right hand end of the power output shaft 11 there is mounted as rotationally connected thereto a hub member 14, and to an outer peripheral flange portion of this hub member 14 there is attached by a plurality of studs 25 a torque converter turbine member 13, which is formed with a plurality of vanes.

In a per se well known way, the pump impeller 5, the turbine member 13, and the stator member 15 provide a function of transmission of rotary power between the pump impeller 5 and the turbine member 13, when the torque converter housing 5 is filled with hydraulic fluid as will be hereinafter explained, by circulation of hydraulic fluid in a toroidal pattern defined by their vanes, in the general circulation fashion of a smoke ring. The torque converter comprising the pump impeller 5, the turbine member 13, and the stator member 15 is physically also generally toroidal in shape, and thus the part remote from the axis of said torque converter of its axial cross sectional shape is curved; in particular, the outer sectional shape of the turbine member 13 is a smoothly rounded curve.

As is per se well known in torque converters of this type, when the torque converter is transmitting rotational power at a high rotational speed, the torque conversion function thereof becomes substantially inconsiderable, and the pump impeller 5, the turbine member 13, and the stator member 15 rotate substantially together, along with a mass of hydraulic fluid, effectively as one unit. However, even at such a high rotational speed, a certain few percent of hydraulic slippage is still liable to occur between the driving pump impeller 5 and the driven turbine member 13, and, while this small hydraulic slippage has no practical effect on the operation of the vehicle to which the torque converter is fitted, such slippage is wasteful of energy and causes undesirable heating up of the hydraulic fluid contained within the torque converter. Accordingly, a lock up clutch assembly is provided for selectively mechanically rotationally coupling together the pump impeller 5 and the turbine member 13, and for thus selectively eliminating said hydraulic slippage. This lock up clutch assembly will now be described.

The outer surface of the hub member 14 is formed as a cylindrical surface 17 which is smooth, and this cylindrical outer surface 17 is slidably engaged with a cylindrically shaped inner surface 19 of a hub portion of a generally disk shaped clutch plate element 18, which axially opposes the inner or left hand (in the drawing) surface of the front cover 3 of the torque converter housing. Around the cylindrical outer peripheral surface 17 of the hub member 14 there is formed an annular groove 20, and within this annular groove 20 there is fitted an annular sealing ring 21, which thus accordingly provides a fluid seal between the cylindrical outer surface 17 of the hub member 14 and the cylindrical inner surface 19 of the clutch plate element 18.

Around the outer periphery of the clutch plate element 18 there is formed a cylindrical axially extending flange, the cylindrical outer surface 22 of which is smooth and opposes the inner cylindrical surface 23 of the leftwardly projecting (in the drawing) flange of the front cover 3 of the torque converter housing. No sealing member is provided for positively ensuring a fluid seal between these two surfaces, but in practice the mutual proximity of the outer cylindrical surface 22 formed on the axially extending flange of the clutch plate member 18 and of the inner cylindrical surface 23 formed on the axially extending flange of the front cover 3 ensures a very restricted gap therebetween, resistance of which to flow of hydraulic fluid therethrough is substantial. On the left hand side in the drawing of the front cover 3 there is provided an annular clutch lining 24, opposing the right hand side of the clutch plate element 18. Accordingly, when the hydraulic fluid pressure on the left hand side in the drawing of the clutch plate element 18 is substantially greater than the hydraulic fluid pressure on the right hand side of said clutch plate element 18, then said clutch plate element 18 is biased to the right in the drawing so as to be tightly brought into contact with the annular clutch facing 24 mounted on the left hand side in the drawing of the front cover 3, and thus the clutch plate element 18 is tightly rotationally coupled to the front cover 3. On the other hand, when the hydraulic fluid pressure on the right hand side in FIG. 1 of the clutch plate element 18 is substantially greater than the hydraulic fluid pressure on the left hand side of said clutch plate element 18, then said clutch plate element 18 is biased to the left in the drawing, away from the front cover 3, and accordingly the clutch plate element 18 and the front cover 3 are rotationally uncoupled from one another.

As will be explained hereinafter, the clutch plate element 18 is rotationally coupled at its outer flange portion, via a rotary shock absorber assembly which will shortly be described in detail, to the hub member 14, which as explained above is rotationally coupled to the power output shaft 11. Accordingly, when the clutch plate element 18 is biased by such an excess as aforesaid of the hydraulic fluid pressure on its left side as seen in the drawing over the hydraulic fluid pressure on its right side towards the front cover 3 so as to be rotationally coupled thereto via the clutch lining 24, the power input shaft 1 is directly rotationally coupled, via the front cover 3, the clutch lining 24, the clutch plate element 18, and the hub member 14, to the power output shaft 11. In this condition, the torque converter assembly comprising the pump impeller 5, the turbine member 13, and the stator member 15 performs no significant function of transmission of rotational power, and rotates as an inert unit along with the hydraulic fluid contained therein, because of the engagement of the above described lock up clutch assembly. In this state, substantially no energy is lost by churning of the hydraulic fluid within the torque converter assembly.

The arrangements for biasing the clutch plate element 18 selectively leftwards or rightwards in the drawing, by providing such a difference as above mentioned between the hydraulic fluid pressures on its left side and on its right side, will now be described.

Two hydraulic fluid channels are provided for the introduction of hydraulic fluid to within the torque converter casing assembly comprising the front cover 3 and the outer casing portion of the pump impeller 5: a first hydraulic fluid channel defined between the fixed sleeve member 9 which supports the stator member 15 and the hollow shaft 6 which supports the pump impeller 5, i.e. through a tubular gap denoted by the reference numeral 32 in the drawing, hydraulic fluid passing through this tubular gap 32 being discharged within the torque converter assembly at points around the base of the stator member 15, on the left hand side of the clutch plate element 18, whence the pressure due to said hydraulic fluid is transmitted through holes 47 in an outer shock absorber element 26 which will be described later to the left hand side of the clutch plate element 18 in the drawing; and a second hydraulic fluid channel defined between the power output shaft 11 and the fixed sleeve member 9, through a tubular gap denoted by the reference numeral 33 in the drawing, hydraulic fluid passing through this tubular gap 33 passing through a radial hole in the power output shaft 11 into a central axial hole 34 bored along the central part of the right hand portion of said power output shaft 11 in the drawing, and then being introduced through a space 35 and radially extending grooves 37 formed on a washer 36 into the space between the clutch plate element 18 and the front cover 3, on the right hand side in the drawing of the clutch plate element 18. Selectively, in a per se well known way, according to various operational parameters of the vehicle incorporating this preferred embodiment of the power transmission device according to the present invention, and of the internal combustion engine incorporated in said vehicle, under the control of a hydraulic fluid pressure control system which is not shown in the drawing and which will not be further described herein otherwise than in terms of its function, hydraulic fluid under pressure from the hydraulic fluid pressure pump assembly 7 is pumped into one of the first and the second hydraulic fluid channels 32 and 33, and is discharged from the other of these channels.

When hydraulic fluid is pumped into the second hydraulic fluid channel 33, so that it is supplied into the space between the clutch plate element 18 and the front cover 3, on the right hand side of the clutch plate element 18 in the drawing, and is discharged from the first hydraulic fluid channel 32, from the space within the torque converter to the left hand side of the clutch plate element 18 in the drawing via the holes 47 formed in the above mentioned outer shock absorber plate element 26, then, because as mentioned above the annular gap between the circumferential outer surface 22 of the clutch plate element 18 and the circumferential inner surface 23 of the leftwardly (in the drawing) projecting flange of the front cover 3 is restricted and presents a substantial resistance to flow of hydraulic fluid, this continuous fluid flow causes the clutch plate element 18 to be biased in the leftwards direction in the drawing, out of contact with the annular clutch lining 24 mounted on the left hand side in the drawing of the front cover 3, and accordingly in this condition the lock up clutch assembly does not function rotationally to couple together the power input shaft 1 and the power output shaft 11, and accordingly the torque converter comprising the pump impeller 5, the turbine member 13, and the stator member 15 performs its power transmitting and torque conversion function, via the above described and per se well known circulation of hydraulic fluid therein.

On the other hand, if the directional sense of the flow of hydraulic fluid through the torque converter is reversed by the aforementioned hydraulic fluid pressure control system from the abovementioned directional sense, i.e., if hydraulic fluid is pumped into the first hydraulic fluid channel 32 so as to be supplied into the interior of the torque converter, and so as to pass via the above mentioned holes 47 in the outer shock absorber plate element 26 to the space on the left hand side of the clutch plate element 18 in the drawing, and is discharged from the second hydraulic fluid channel 33, so that said hydraulic fluid is taken out from the space between the clutch plate element 18 and the front cover 3, then the clutch plate element 18 is biased to the right in the drawing, so that said clutch plate element 18 is securely engaged against the annular clutch lining 24 provided on the left hand side in the drawing of the front cover 3. In this condition, the lock up clutch assembly provides its function of directly rotationally coupling together the power input shaft 1 and the power output shaft 11, and the torque converter assembly comprising the pump impeller 3, the turbine member 13, and the stator member 15 is relieved of its function of transmitting rotational power between the power input shaft 1 and the power output shaft 11.

When the lock up clutch assembly described above is being switched from its non connected state to its connected state, there is a risk that a sudden torque shock will occur, because even when the vehicle incorporating this torque converter is being operated at high speed there is always a certain difference of rotational speed between the power input shaft 1 and the power output shaft 11, due to the aforesaid residual few percent of hydraulic slippage between the pump impeller 5 of the torque converter and the turbine member 13 thereof. Further, during the state of engagement of the lock up clutch assembly, it is desirable to cushion the effect of torque shocks which may be transmitted along the power train, either from the road wheels of the vehicle incorporating this rotary power transmission device to the internal combustion engine thereof, or vice versa. Therefore, as mentioned above, a rotary shock absorber assembly, which will now be described and to which the present invention relates, is provided in the power train of the lock up clutch. This rotary shock absorber assembly serves both to cushion the rotational shock of the engagement of the lock up clutch, and also to cushion rotational shocks being transmitted along the power train while the lock up clutch is engaged. As outlined before, with the object of minimizing the axial length of the torque converter incorporating this lock up clutch, this rotary shock absorber assembly is arranged to be provided as physically located in an annular space defined between the outer part of the torque converter assembly, i.e., the outer part of the turbine member 13 thereof, which as explained above is of curved axial cross sectional shape, and the outer part of the clutch plate element 18 which as explained above is of substantially a disk shape. The advantageous use of this roughly toroidal with triangular cross section shaped space for the mounting of the rotary shock absorber assembly results in a very useful shortening of the total axial length of the construction; but this arrangement, as outlined above, requires that the rotary shock absorber assembly should be of a large radius, substantially equal to the outer radius of the clutch plate element 18, and accordingly the centrifugal and other forces acting thereon are substantial, and the danger of flexing of the parts thereof is substantial, especially when the vehicle is being operated in the high torque converter rotational speed and/or the high engine load operational condition. The measures taken to overcome the problems arising because of these high forces, as well as because of flexing of the members of the rotary shock absorber assembly, will be seen hereinafter.

Figure 2:
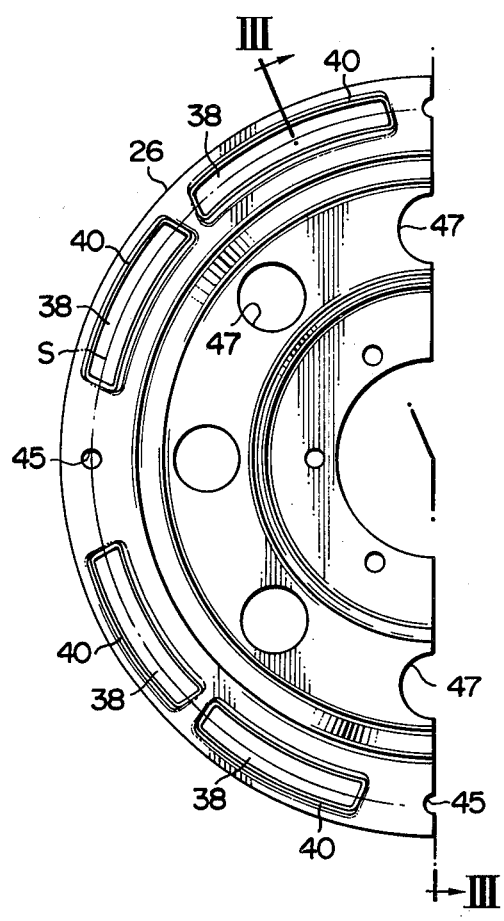
FIG. 2 is a partial plan view of a disk shaped shock absorber plate element included in the rotary shock absorber assembly of the preferred embodiment of the rotary power transmission device according to the present invention shown in FIG. 1.
Figure 3:
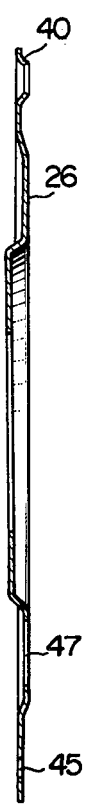
FIG. 3 is a sectional view through the disk shaped outer shock absorber plate element shown in FIG. 2, taken along planes shown by the lines III—III in FIG. 2.

The rotary shock absorber assembly in the shown preferred embodiment comprises two outer shock absorber plate elements 26 and 27, which are axially mutually opposed, and one inner shock absorber plate element 29 which is sandwiched between said outer shock absorber plate elements 26 and 27. The outer shock absorber plate elements 26 and 27 are rotationally coupled together by four pins 28, only one of which can be seen in FIG. 1, each of which is individually securely fixed to each of the shock absorber plate elements 26 and 27, each of which passes through a circular hole designated by 45 in the outer shock absorber plate element 26 and through a corresponding circular hole designated by 46 in the outer shock absorber plate element 27, and each of which also passes through a corresponding circumferentially extending arcuate slot shaped aperture 43 in the inner shock absorber plate element 29. These arcuate slot shaped apertures 43 in the inner shock absorber plate element 29, which may be best seen in FIG. 5, which is a partial sectional view through the inner shock absorber plate member 29 and through one of the pins 28 and a bearing element 44 mounted thereon taken along a plane indicated by the lines V—V in FIG. 1, are formed as slots in order not to hamper the limited rotational movement of the inner shock absorber plate element 29 with respect to the outer shock absorber plate elements 26 and 27 which is necessary for functioning of the rotary shock absorber assembly as will be seen hereinafter. The disk shaped bearing elements 44 are of approximately the same axial extension as the thickness of the inner shock absorber plate element 29, and each of these bearing elements 44 contacts with its periphery the radially inner side 43a of the arcuate slot shaped aperture 43 in the inner shock absorber plate element 29 in which it is fitted. Thus, as the inner shock absorber plate element 29 performs the limited rotation of which it is capable, as will be seen hereinafter, with respect to the outer shock absorber plate elements 26 and 27, each of these bearing elements 44 is rotated around its pin 28 like a roller, rolling on the radially inner side 43a of the slot shaped aperture 43 in the inner shock absorber plate element 29 in which it is fitted, and thus at this time, because of course as seen particularly in FIG. 2 there are provided four (generally more than two) of the holes 45 in the outer shock absorber plate element 26, of the slot shaped apertures 43 in the inner shock absorber plate element 29, and of the pins 28 passing therethrough with the bearing elements 44 mounted thereon, and because these four arcuate slot shaped apertures 43 are symmetrically disposed around the central axis of the inner shock absorber plate element 29, the inner shock absorber plate element 29 is thus kept definitely and positively coaxial with the outer shock absorber plate elements 26 and 27, even though this inner shock absorber plate element 29 is formed as a ring shaped member. i.e. as an annulus, and is not particularly engaged with any member at its inner peripheral part.

The outer shock absorber plate element 27, in this embodiment, and the inner shock absorber plate element 29 are formed as substantially flat annuli, and lie generally in the aforesaid annular or toroidal space defined between the outer part of the turbine member 13 of the torque converter and the outer portion of the substantially flat clutch plate element 18. The other outer shock absorber plate element 26 is formed substantially as a flat disk with a central hole therethrough, and the inner peripheral portion of this flat disk shaped outer shock absorber plate element 26 is connected by the aforementioned studs 25 to the hub member 14, which as described above is rotationally coupled to the power output shaft 11. The aforementioned holes 47 are formed as pierced through the outer shock absorber plate element 26 from its one side to its other side, in order, as explained above, to transmit hydraulic fluid pressure between the two sides of said outer shock absorber plate element 26. In the shown embodiment, in fact, eight such holes 47 are provided, and are symmetrically located around the central axis of the rotary damper assembly. In principle, however, the provision of even only one such hole would be sufficient to embody the concept of the present invention. Although in the shown embodiment of the rotary power transmission device according to the present invention the shock absorber plate element 26 is in fact connected to the hub member 14 by the same studs 25 which connect the turbine member 13 thereto, and is sandwiched between the turbine member 13 and the hub member 14, this construction is not essential. Further, the outer peripheral portion of the annular inner shock absorber plate element 29 is rotationally coupled to the edge portion of the outer circumferential leftwardly axially extending flange portion of the clutch plate element 18, by means of the engagement of outwardly projecting ear portions on the shock absorber plate element 29 with corresponding cutaway portions formed in the axially extending flange portion of the clutch plate element 18. The combination of the outer shock absorber plate elements 26 and 27 is rotationally coupled, as will be seen hereinafter, with a certain amount of resilient rotational play available therebetween, to the inner shock absorber plate element 29, and thereby, as stated above, the clutch plate element 18 is connected with a certain amount of resilient rotational play therebetween to the hub member 14 which is rotationally coupled to the power output shaft 11, via this rotary shock absorber assembly which provides said certain amount of resilient rotational play.

In a different embodiment of the present invention, the configuration of this rotary shock absorber plate assembly could be somewhat different. It would be possible for the rotational coupling of the outer shock absorber plate element 26 to the hub member 14, and the rotational coupling of the inner shock absorber plate element 29 to the clutch plate member 18, to be reversed. In such a configuration, the inner shock absorber plate element 29 would be formed as a disk element, the inner part of which was rotationally coupled to the hub member 14, and both of the outer shock absorber plate elements 26 and 27 would be formed as substantially flat annuli, the outer part of at least one of them being rotationally coupled to the outer peripheral portion of the clutch plate member 18. Such a rotary shock absorber assembly would still generally lie within the aforesaid annular or toroidal space defined between the outer part of the torque converter turbine 13 and the substantially flat clutch plate member 18, and the torque transmitting and cushioning function of the rotary shock absorber assembly would remain the same as in the shown preferred embodiment.

The arrangements for resilient rotational coupling between the outer shock absorber plate elements 26 and 27 and the inner shock absorber plate element 29 will now be described.

Figure 4:
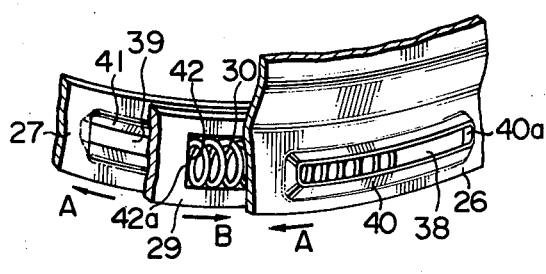
FIG. 4 is an exploded perspective view of a peripheral part of these axially superposed shock absorber plate elements of the rotary shock absorber assembly included in the preferred embodiment of the rotary power transmission device according to the present invention shown in FIG. 1.

The inner ring shaped shock absorber plate element 29 is formed with a number of generally circumferentially extending arcuate slot shaped apertures 42. There are formed in each of the outer shock absorber plate elements 26 and 27 a plurality of generally circumferentially extending slot shaped apertures 38 and 39 respectively, each opposing one of these slot shaped apertures 42 in the inner shock absorber plate element 29. Around the entire periphery of each of the circumferentially extending slot shaped apertures 38 in the first shock absorber plate element 26 there is formed a raised lip 40, which projects out from the general plane of said outer shock absorber plate element 26 away from the inner shock absorber plate element 42, as best seen in FIG. 4. Correspondingly, around the entire periphery of each of the circumferentially extending slot shaped apertures 39 in the second shock absorber plate element 27 there is formed a raised lip 41, which projects out from the general plane of said outer shock absorber plate element 27 in the direction away from the inner shock absorber plate element 29. Each of these raised lips 40 and 41 extends all around the periphery of its circumferentially extending slot shaped opening 38 or 39 respectively in its shock absorber plate element 26 or 27, including extending around the end portions of said circumferentially extending slot shaped opening 38 or 39. The reference numeral 40a in FIG. 4 denotes one such end portion of the lip member 40 which extends along an end portion of one of the slot shaped openings 38 in the shock absorber plate element 26.

In the shown preferred embodiment of the rotary power transmission device according to the present invention, the raised lips 40 and 41 form acute angles with the planes of their respective shock absorber plate elements 26 and 27, and in the particular shown preferred embodiment these angles are approximately 45°. Such a construction may conveniently and desirably be made by pressing the lip portions 40 and 41 at the time of press forming the shock absorber plate elements 26 and 27. This makes for strength of construction. It has been discovered that the strength of the lip portions 40 and 41 is of considerable importance for the durability of the rotary shock absorber assembly of the direct engaging clutch as a whole.

Further, in the shown preferred embodiment of the rotary power transmission device according to the present invention, for reasons which will be explained later, the pins 28 are located at substantially the same radial distance out from the central rotational axis of the rotary shock absorber assembly as the slot shaped openings 38 and 39. In other words, referring to FIG. 2 which shows an end on view of the outer shock absorber plate element 26, the circumferentially extending slot shaped openings 38 in this outer shock absorber plate element 26 are located on approximately the same circumferential line S thereon as are the holes 45, at substantially the same radial distance out from the central rotational axis of the rotary shock absorber assembly. Similarly, of course, although it is not explicitly so shown in the drawings, the circumferentially extending slot shaped openings 39 in the outer shock absorber plate element 27 are located on approximately the same circumferential line thereon as are the holes 46, at substantially the same radial distance out from the central rotational axis of the rotary shock absorber assembly; and the circumferentially extending slot shaped openings 42 in the inner shock absorber plate element 29 are located on approximately the same circumferential line thereon as are the slot shaped openings 43, at substantially the same radial distance out from the central rotational axis of the rotary shock absorber assembly.

Figure 5:
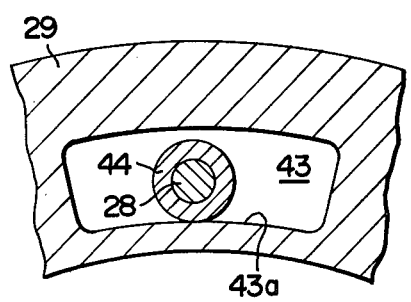
FIG. 5 is an enlarged partial cross sectional view of a part of one of the shock absorber plate elements formed with an arcuate slot opening and a pin element with a bearing element engaged in the slot opening, said sectional view being taken along a plane indicated by the lines V—V in FIG. 1

Within the plurality of circumferentially engaging slot shaped apertures 42 formed in the inner shock absorber plate element 29 there are received a plurality of compression coil springs 30, whose axes extend generally circumferentially to the inner shock absorber plate element 29 and lie generally within its plane, along the slot shaped apertures 42. The sides of these compression coil springs 30 project out somewhat beyond the sides of the inner shock absorber plate element 29, and extend into the circumferentially extending slot shaped apertures 38 and 39 of the outer shock absorber plate elements 26 and 27, and are desirably, as in the shown embodiment, seated against the inwardly facing sides of the raised lips 40 and 41 which are formed along the circumferential peripheries of the circumferentially extending slot shaped apertures 38 and 39, because said raised lips 40 and 41 extend at acute angles of approximately 45° to the planes of these shock absorber plate elements 26 and 27. As has been mentioned above, the shock absorber plate elements 26 and 27 are firmly rotationally, and also axially, coupled together by the plurality of pins 28, which pass through the circumferentially extending slot shaped apertures 43 in the inner shock absorber plate element 29 which are shown in FIG. 5, and accordingly the outer shock absorber plate elements 26 and 27 are not able axially to be separated by much more than the thickness of the inner shock absorber plate element 29 which is sandwiched between them, because they are retained in their positions relative to one another by the pins 28. Thereby, the compression coil springs 30 are held in place within the sandwich composed of the shock absorber plate elements 26, 29, and 27 in that order.

As a modification of the shown preferred embodiment of the rotary power transmission device according to the present invention, it would be possible to provide a friction element or elements either between the outer shock absorber plate element 26 and the inner shock absorber plate element 29, or between the outer shock absorber plate element 27 and the inner shock absorber plate element 29, or both, in order to provide a certain amount of rotational damping in the resilient relative rotational movement between the combination of the outer shock absorber plate elements 26 and 27, and the inner shock absorber plate element 29. This construction would serve to prevent the possibility of the occurrence of transmission of rotational vibration along the power train, as well as the occurrence of vibration within the rotary shock absorber assembly caused by sudden torque shocks transmitted thereto. Such a modification should be understood as coming within the scope of the present invention, as a useful improvement thereof.

The rotary shock absorber assembly constructed as described above operates as follows. When the lock up clutch comprising the clutch plate element 18 and the front cover 3 is engaged by the hydraulic fluid pressure on the left hand side of the clutch plate element 18 being higher than the hydraulic fluid pressure on the right hand side of the clutch plate element 18, according to the pumping of hydraulic fluid into the first hydraulic fluid channel 32 so that said hydraulic fluid is supplied into the interior of the torque converter through the eight holes 47 in the outer shock absorber plate element 26 to the space on the left hand side of the clutch plate element 18 in the drawing, and according to the discharging of hydraulic fluid out from the second hydraulic fluid channel 33 so that said hydraulic fluid is taken out from the space between the clutch plate element 18 and the front cover 3 on the right hand side of the clutch plate element 18 in the drawing, as explained above, then it may well occur that a substantial torque jerk is suddenly required to be transmitted between the combination of the outer shock absorber plate elements 26 and 27 and the inner shock absorber plate element 29. Suppose that, as shown in FIG. 4, the inner shock absorber plate element 29 requires, according to such a torque jerk, to be rotated in the counterclockwise direction with respect to the outer shock absorber plate elements 26 and 27, as shown by the arrows A and B in the drawing. In such a condition, the ends in the clockwise direction of the compression coil springs 30 will be pressed against the ends 42a of the circumferentially extending slot shaped apertures 42 in the inner shock absorber plate element 29, and the ends in the anticlockwise direction of the compression coil springs 30 will be pressed against the end portions 40a of the raised lips 40 which extend along the end portions in the counterclockwise direction of the circumferentially extending slot shaped apertures 38 in the outer shock absorber plate element 26, and also against the symmetrically disposed, but not visible in the drawing, parts of the raised lips 41 which extend along the end portions in the counterclockwise direction of the circumferentially extending slot shaped apertures 39 in the outer shock absorber plate element 27. By the relative rotational movement between the inner shock absorber plate element 29 and the outer shock absorber plate elements 26 and 27, in this condition, the compression coil springs 30 will be compressed, and will absorb the aforesaid rotational torque jerk, thus cushioning a torque jerk which is being transmitted from the power input shaft 1 in the direction towards the power output shaft 11, or vice versa. Thus, a buffer effect is provided within the lock up connection provided by the lock up clutch assembly between the power input shaft 1 and the power output shaft 11, by this rotary shock absorber mechanism. It will be clear, of course, that torque jerk in the other rotational direction between the power input shaft 1 and the power input shaft 11 will also be cushioned by this rotary shock absorber assembly, by the other ends of the compression coil springs 30 impacting against the other ends of the apertures in the outer and inner shock absorber plate elements 26, 27 and 29.

During this action of cushioned transmission of torque jerk between the power input shaft 1 and the power output shaft 11, the fact that the eight holes 47, of a substantial size, are provided in the outer shock absorber plate element 26 means that a certain amount of rotational flexibility is available between the outer peripheral part of this outer shock absorber plate element 26, on which the ends of the compression coil springs 30 bear, and the inner part of this outer shock absorber plate element 26, which is as described above rotationally coupled, via the studs 25, to the hub member 14. Thus an additional action of cushioning of torque jerk between the power input shaft 1 and the power output shaft 11 is available, by the provision of the holes 47, although as explained above the primary reason for the provision of these holes 47 is to allow hydraulic fluid pressure to be freely transmitted from the space around the base of the stator member 15 past the outer shock absorber plate element 26 to the left hand side in the drawing of the clutch plate element 18. As will be readily understood, the fact that the holes 47 are provided as symmetrically located around the central rotational axis of the rotary damper assembly means that the outer shock absorber plate element 26 is stronger than would otherwise be the case.

As the inner shock absorber plate element 29 rotates by the limited degree of which it is capable according to such a torque jerk with respect to the outer shock absorber plate elements 26 and 27, each of the bearing elements 44 is rotated around its pin 28 like a roller, rolling on the radially inner side 43a of the slot shaped aperture 43 in the inner shock absorber plate element 29 in which said bearing element 44 is fitted, and thus at this time the inner shock absorber plate element 29 is kept definitely and positively coaxial with the outer shock absorber plate elements 26 and 27, even though the inner shock absorber plate element 29 is formed as a ring shaped member or an annulus, and is not particularly engaged with any member by its inner peripheral part.

At this time, because the circumferentially extending slot shaped openings 39 in the ring shaped or annular outer shock absorber plate element 27 are located on approximately the same circumferential line S as are the holes 46 therethrough, at substantially the same radial distance out from the central rotational axis of the rotary shock absorber assembly, therefore the forces which are exerted on the end portions of the raised lips 41 which extend along the end portions of the circumferentially extending slot shaped apertures 39 in this outer shock absorber plate element 27 are smoothly balanced by the forces which are exerted on the sides in the circumferential direction of the holes 46 in this outer shock absorber plate element 27, and the combination of these forces does not particularly tend to cause buckling in the outer shock absorber plate element 27. This is particularly important because in the construction as described above the outer shock absorber plate element 27 is formed as an annulus or ring shaped member of a not very great radial dimension, which as a matter of course has less stiffness than does a disk shaped member. Further, a similar anti buckling effect is available, although it is less important, for the outer shock absorber plate element 26 with regard to the circumferentially extending slot shaped openings 38 and the holes 45, and for the inner shock absorber plate element 29 with regard to the circumferentially extending slot shaped openings 42 and the slot shaped openings 43, since all of these formations are located at substantially the same radial distance out from the central rotational axis of the rotary shock absorber assembly.

According to this construction, because the outer shock absorber plate elements 26 and 27 are formed with the raised lips 40 and 41, respectively, and because these raised lips 40 and 41 extend all around the entire peripheries of the circumferentially extending slot shaped apertures 38 and 39 in these outer shock absorber plate elements 26 and 27, respectively, including around the end portions thereof in the circumferential direction, in a continuous fashion, thereby such a construction is much stronger than prior art constructions in which the circumferentially extending slot shaped apertures such as 38 and 39 of the shock absorber plate elements of previous rotary shock absorbers were formed only with flaps on their long sides, i.e., along their circumferentially extending sides, but were not formed with any flap or lip portions at their ends in the circumferential direction, i.e., along their short sides. This is because the portions such as 40a of the raised lips 40 and 41, i.e., the parts of the raised lips 40 and 41 which extend in a substantially radial direction to the shock absorber plate elements 26 and 27, serve substantially to brace the outer shock absorber plate elements 26 and 27, and particularly the outer shock absorber plate element 27 which is formed as an annulus of a not very great radial dimension, against bending.

Further, in the shown preferred embodiment of the present invention because the raised lips 40 and 41 extend generally at acute angles to the planes of the outer shock absorber plate elements 26 and 27 respectively of which they form part, and in particular in the shown preferred embodiment at angles of approximately 45° thereto, thereby the compression coil springs 30 are snugly held by these angled raised lip portions 40 and 41 properly in place in between the outer shock absorber plate elements 26 and 27, and the central axes of these compression coil springs 42 are well maintained substantially in the central plane of the inner shock absorber plate element 29, even when a considerable centrifugal force is exerted upon these compression coil springs by fast rotation of the rotary shock absorber assembly as a whole. Again, in this construction, the provision of the end portions such as 40a of the raised lips aids in this snug holding of the compression coil springs 30.

It will be clear to one skilled in the art, based upon the foregoing explanation, that, because the raised lips 40 and 41 are continuous all around the peripheries of the circumferentially extending slot shaped apertures 38 and 39, thereby these peripheries of the slot shaped apertures 38 and 39 are much reinforced, and accordingly a much stronger rotary shock absorber as a whole is attained by the present invention, and this rotary shock absorber is able to withstand much greater centrifugal forces, applied for a longer period of use of the rotary shock absorber, than the above outlined prior art constructions. This is particularly important, as explained above, because the rotary shock absorber according to the shown preferred embodiment of the present invention is located within the aforesaid annular space left between the toroidal torque converter comprising the turbine member 13, and the substantially plate shaped clutch plate element 18, and accordingly is of relatively large radius. In such a configuration, strength of the rotary shock absorber assembly with regard to the centrifugal forces which act thereon when it rotates at high speed is a critical design factor.

Although the present invention has been shown and described in terms of a preferred embodiment thereof, and in language more or less specific with regard to structural features thereof, and with reference to the illustrative drawings, it should be understood that in any particular embodiment of the present invention various changes, modifications, and omissions of the form and the detail thereof could be made by a person skilled in the art, without departing from the essential scope of the invention. Therefore, it is expressly desired that the scope of the present invention should be uniquely delimited by the legitimate and valid scope of the appended claims, which follow, and not by any of the perhaps purely fortuitous details of the shown embodiment, or of the drawings.

What is claimed is:

1. A rotary power transmission device for transmitting rotary power rotating around a central rotational axis, comprising:

(a) coaxial power input and power output shafts;
(b) a fluid torque converter comprising a pump impeller rotationally connected to said power input shaft, a turbine member rotationally connected to said power output shaft, and a stator member;
(c) a substantially disk shaped clutch assembly coaxial with said torque converter, said clutch assembly comprising a first clutch plate element rotationally coupled to said power input shaft and having a cylindrical outer flange portion firmly connected with a radially outside peripheral portion of said pump impeller, thereby defining an annular space adjacent a radially outer peripheral portion of said turbine member, and a second clutch plate element axially opposing said first clutch plate element;
(d) a rotary shock absorber mounted between said torque converter and said clutch assembly so as rotationally to couple said second clutch plate element and said power output shaft with a certain amount of resilient rotational play therebetween, comprising:
  (d1) three axially superposed shock absorber plate elements, one of said three shock absorber plate elements being shaped as a substantially flat disk and the other two of said three shock absorber plate elements being shaped as substantially flat rings axially superposed with an outer peripheral portion of said disk shaped plate element, at least one of said ring shaped plate elements being rotationally coupled to said second clutch plate element, and the two outer ones of said shock absorber plate elements being rotationally coupled together, said disk shaped plate element being formed with an opening therethrough at a radially intermediate portion thereof and located between said turbine member and said clutch assembly and directly rotationally connected at an inner peripheral portion thereof to said output shaft in parallel with and separately from said turbine member; and
  (d2) a means for rotationally connecting together the combination of said two outer shock absorber plate elements and the middle shock absorber element with a certain amount of resiliently opposed rotational play being available therebetween; said two ring shaped plate elements, the outer peripheral portion of said disk shaped plate element, and said means for rotationally connecting together the combination of said two outer shock absorber plate elements and the middle shock absorber plate element being located in said annular space; and
(e) hydraulic pressure conducting means for selectively conducting hydraulic fluid pressure for hydraulically biasing said first and second clutch plate elements towards and away from one another, so as to engage to and disengage from one another.

2. A rotary power transmission device according to claim 1, wherein said opening formed in said disk shaped plate element comprises a plurality of holes substantially uniformly angularly spaced along a radially intermediate annular region of said disk shaped plate element.

3. A rotary power transmission device according to claim 2, wherein said holes are circular holes of substantially the same diameter.

* * * * *